United States Patent [19]

Reitmeier

[11] Patent Number: 4,746,919
[45] Date of Patent: May 24, 1988

[54] REMOTE CONTROL SYSTEM WITH KEY FUNCTION DISPLAY PROVISIONS

[75] Inventor: Glenn A. Reitmeier, West Trenton, N.J.

[73] Assignee: RCA Licensing Corporation, Princeton, N.J.

[21] Appl. No.: 845,184

[22] Filed: Mar. 28, 1986

[51] Int. Cl.[4] .......................... H04Q 1/00; H04Q 7/00
[52] U.S. Cl. .......................... 340/825.56; 340/825.54; 340/825.69; 340/825.72; 340/696; 340/365 VL; 340/712; 358/194.1
[58] Field of Search ............ 340/365 VL, 365 R, 711, 340/712, 696, 825.55, 825.56, 825.69, 825.72, 825.54; 358/194.1; 455/151, 353, 603, 352

[56] References Cited

U.S. PATENT DOCUMENTS

| | | | |
|---|---|---|---|
| 4,280,121 | 7/1981 | Crask | 340/712 |
| 4,322,855 | 3/1982 | Mogi et al. | |
| 4,333,090 | 6/1982 | Hirsch | 340/365 VL |
| 4,431,988 | 2/1984 | Molusis et al. | 340/365 VL |
| 4,529,980 | 7/1985 | Liotine et al. | 340/696 |
| 4,551,717 | 11/1985 | Dreher | |
| 4,566,034 | 1/1986 | Harger et al. | |
| 4,626,847 | 12/1986 | Zato | 340/696 |

FOREIGN PATENT DOCUMENTS

0057970 8/1982 Europeon Patent Off.
0120345 10/1984 Europeon Patent Off.
0129286 12/1984 Europeon Patent Off.

OTHER PUBLICATIONS

"A New Intelligent Remote Control Unit for Consumer Electronic Devices", Platte et al., IEEE Transactions on Consumer Electronics, vol. CE 31, No. 1, 2/85.
P. 15 of "Television Digest", Jun. 3, 1985, vol. 25, No. 22.
P. 64 of "Popular Science", Sep. 1985 in the What's New in Electronics seection.
P. 17 of "Television Digest", Nov. 11, 1985, vol. 25, No. 46.
PP. C1 and C10 of the Mar. 6, 1986 "New York Times", article entitled Remote Control Units, Getting to Know Them.
An article entitled "Three Types of Touch Technology Simplify Man/Machine Interface" by Arthur B. Carroll appearing on pp. 167-172 of Computer Technology Review.
Advertising literature entitled "TIX Adds Touch Communication to Your Display", published by Elographics, Inc. of Oak Ridge, Tenn.

*Primary Examiner*—John W. Caldwell, Sr.
*Assistant Examiner*—Edwin C. Holloway, III
*Attorney, Agent, or Firm*—Eugene M. Whitacre; Paul J. Rasmussen; Peter M. Emanuel

[57] ABSTRACT

A transmitter unit of a remote control system includes a key function display unit for identifying the function of key elements of the transmitter unit at various steps of a control sequence for one or more controlled devices. The memory for storing character-representative information for identifying the functions of the key elements of the transmitter and corresponding function control instructions is contained in the controlled devices rather than in the transmitter unit. This allows for the addition of new controlled device without modification of the transmitter units.

5 Claims, 3 Drawing Sheets

REMOTE CONTROL SYSTEM WITH KEY FUNCTION DISPLAY PROVISIONS

FIELD OF THE INVENTION

The present invention concerns a remote control system.

BACKGROUND OF THE INVENTION

Remote control systems are used to allow a controlled device to be controlled from a remote location. For example, many consumer electronic products such a television receivers, video cassette recorders (VCRs), audio record and cassette players, have associated handheld remote control transmitter units for controlling various functions from a viewing or listening position.

A typical remote control transmitter unit has a keyboard with a plurality of keys or buttons corresponding to the functions to be controlled. Usually the more functions that have to be controlled, the greater the number of keys that have to be provided. Since modern consumer electronic products have a very large number of control functions, the keyboard of remote control transmitter units of such products are often cluttered with keys. Some manufacturers provide a single, unified remote control unit for several controlled devices, such as a television receiver and a VCR which are intended to be operated together. The keyboards of such unified remote control transmitter units, therefore, may contain even more keys than dedicated remote control units for individual controlled devices.

Remote control transmitter units with a large number of keys tend to be cumbersome to use and expensive to manufacture. Accordingly, there is a desire in the art to reduce the number of keys of remote control transmitter units.

There have been attempts to reduce the number of keys by assigning multiple functions to at least some keys. The particular function of a key at any time can be determined by a mode switch or by the sequence of prior key operations. To guide users, labels on the keyboard identifying the various functions of the keys may be employed. It is also possible in a television system with a viewing screen, to use the viewing screen to display information indicating the functions of the keys of the remote control transmitter during various modes of operation. However, such prior approaches are indirect and, therefore, may be confusing.

To avoid the confusion that may result from the indirect key function identification technique described above, it has been proposed in European Patent Application Publication No. 0 120 345 to provide a display arrangement on the remote control transmitter unit itself to identify the particular functions of keys at various steps of a control operation. The display arrangement may take the form of individual display devices located near respective keys or of individual display elements underlying transparent keys. Each display device is capable of displaying characters designating the function of the associated key. The information for the key function display arrangement is stored in a display memory contained in the remote control transmitter unit. For expansion, display memories for additional devices that may be controlled by the remote control transmitter unit may be added to the remote control transmitter unit.

While the type of remote control system described in the European patent application is useful, the provisions for expanding its capability to control new devices by adding display memories may be troublesome to users and may limit the number of devices that can be controlled due to wiring and size constraints of the remote control transmitter unit.

SUMMARY OF THE INVENTION

A remote control system constructed in accordance with the present invention comprises a transmitter unit including a multi-function user entry device with key elements and a display unit for identifying the functions of the key elements at various steps of a control algorithm or sequence. The receiver unit of the remote control system, in addition to generating control signals for an associated controlled device in response to remote control messages received from the transmitter unit, includes a key function and display memory for storing information indicative of the functions of key elements of the transmitter unit. During various steps of the control algorithm, character representative data is retrieved from the key function and display memory and transmitted from the receiver unit to the transmitter unit. In response to the received character representative signals, the display unit displays information identifying the functions of the key elements.

Since the key function and display memory is contained in the receiver unit of the remote control system, rather than in the transmitter unit, the same transmitter unit can be used without modification for additional controlled devices. Also, there is no limit on the number of new controlled devices that may be controlled by the transmitter unit.

In a preferred embodiment of the invention, the key elements comprise areas on a touch-sensitive transparent or translucent membrane which overlays a display panel such as a liquid crystal device (LCD).

These and other features of the present invention will be explained in the following description with respect to the accompanying Drawing.

DETAILED DESCRIPTION OF THE DRAWING

Figure 1:
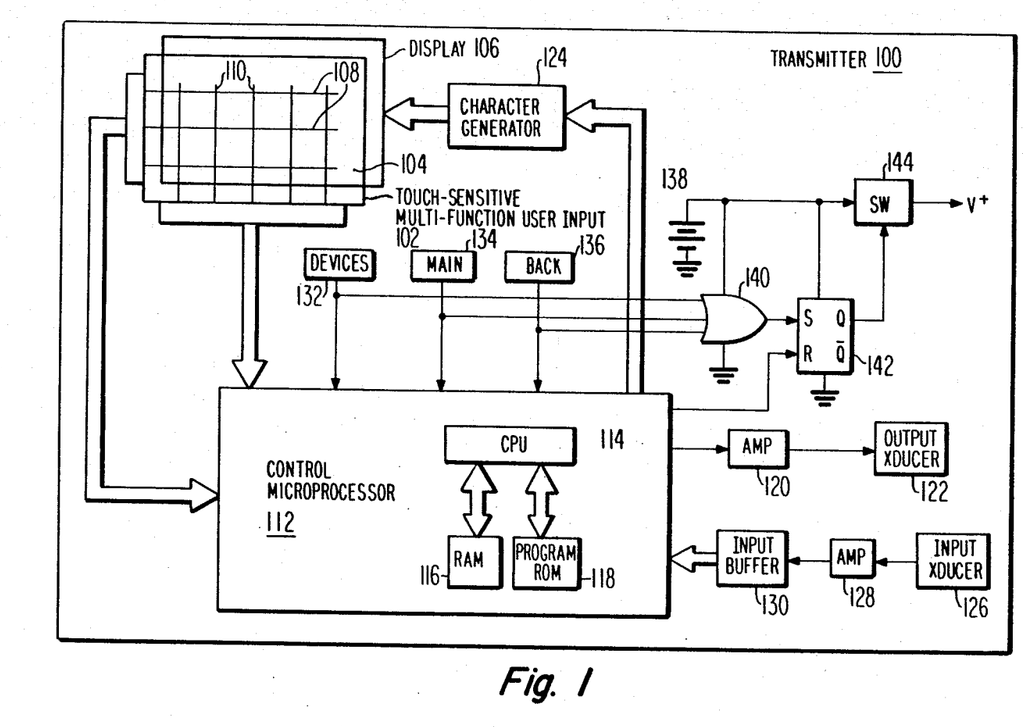
FIGS. 1 and 2 show, in block diagram form, the transmitter and receiver units of a remote control system constructed in accordance with the present invention.
Figure 2:
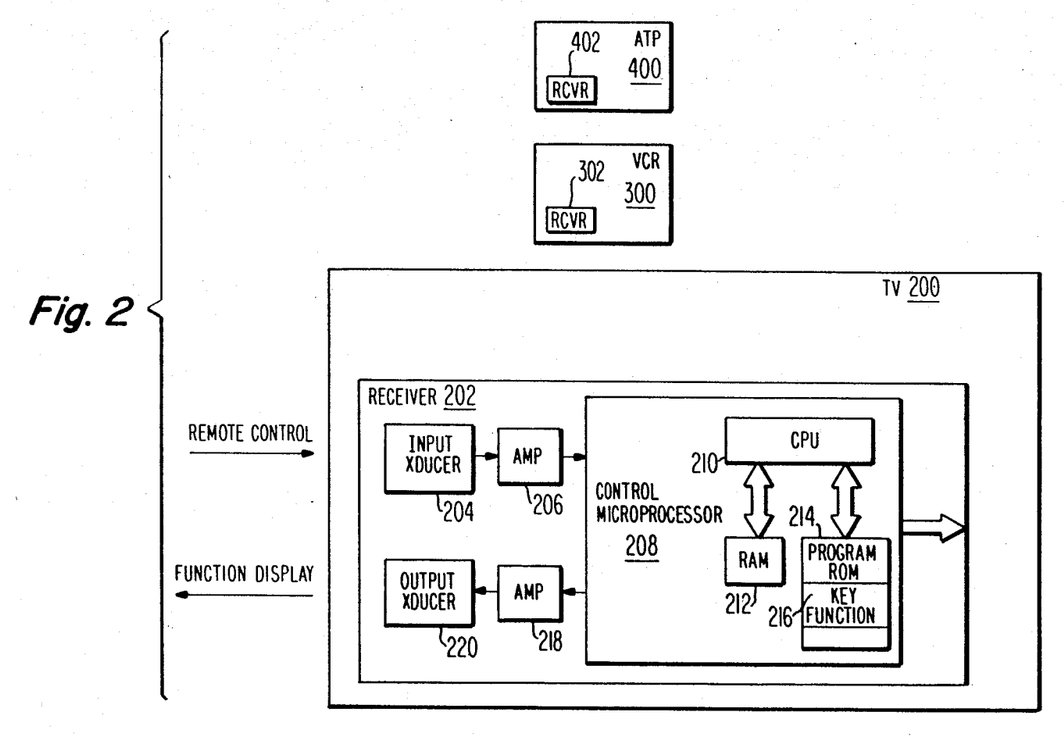
Figure 3:
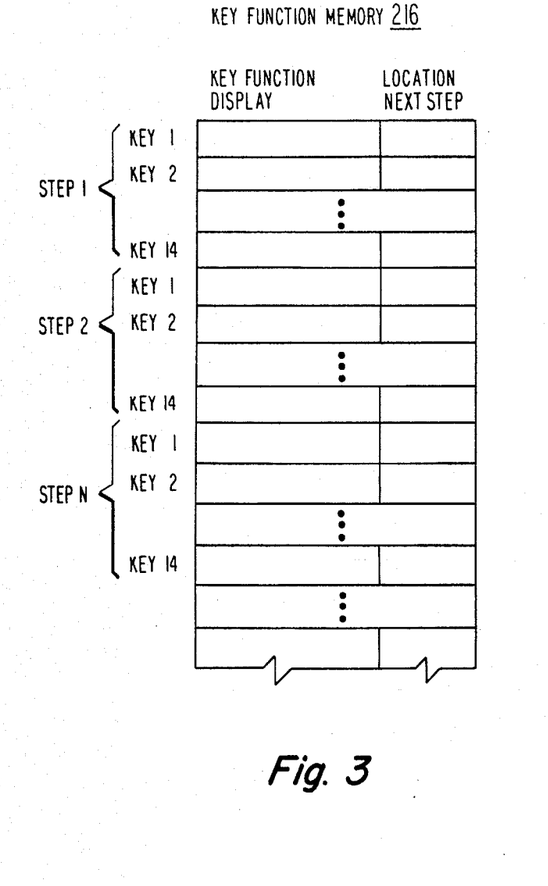
FIG. 3 indicates the contents of a key function and display memory included with the receiver unit of the remote control system shown in FIGS. 1 and 2.

Before describing the embodiment of the remote control system shown in FIGS. 1, 2 and 3 in detail, a brief summary of some of its features is provided.

In the present remote control system shown in FIGS. 1, 2 and 3, a single remote control transmitter controls several controlled devices, such as a television receiver (TV), video cassette recorder (VCR) and audio tape player (ATP). Each controlled device has a relatively large number of functions to be controlled. In order to reduce the clutter and cost associated with fixed or dedicated function arrangements, the keys of the remote control transmitter have multiple functions. A display unit is provided on the remote control transmitter itself to identify the various functions of the keys.

The control process or algorithm provided by the remote control system shown in FIGS. 1, 2 and 3, occurs sequentially in steps of increasing levels of specificity. By way of example, the device to be controlled (e.g., TV, VCR or ATP) is selected at a first control level; the property of the device to be controlled (e.g., reception channel, picture response or audio response of a television receiver) is selected at a second control level; and the specific manner in which a characteristic of the selected property is to be controlled (e.g., increasing or decreasing the brightness, contrast or peaking of the picture) is selected at a third control level. More levels of control may be provided. For example, instead of actually controlling the specific manner in which a characteristic of a selected property is to be controlled (e.g., increasing or decreasing the contrast) at the third level, the third level may be used merely to select the characteristic of the selected property to be controlled (e.g., the brightness, contrast or peaking of the picture) and a fourth level may be provided to select the specific manner in which the selected characteristic is to be controlled (e.g., increasing or decreasing the contrast).

Referring now to FIG. 1, a remote control transmitter 100 includes a multi-function user input device 102 comprising a transparent or translucent, flexible touch-sensitive membrane 104 which overlays a key function display panel 106. Key function display panel 106 displays information for identifying the functions of the "keys" or key elements of membrane 104 at various steps of a control sequence. By way of example, display panel 106 may comprise a liquid crystal device (LCD).

The centers of the touch areas of the "keys" of user input device 102 are defined by the intersection or cross-over points of relatively thin row and column conductors 108 and 110, respectively, within respective layers of membrane 104. Row conductors 108 are normally not electrically in contact with column conductors 110. When a user depresses the surface of membrane 104 in touch areas surrounding the cross-over points, respective ones of row conductors 108 and column conductors 110 are brought into electrical contact. Row conductors 108 and column conductors 110 are coupled (through respective connectors indicated by blocks) to a control unit 112 comprising, e.g., a microprocessor or microcomputer. As is conventional, control unit 112 includes a central processing unit (CPU) 114, a random access memory (RAM) 116 for the temporary storage of data and a read only memory (ROM) 118 containing a control program. Control unit 112 senses which ones of row conductors 108 and column conductors 110 have been brought into electrical contact and generates a corresponding digitally coded remote control message. The digital coded remote control message is coupled in serial form to an amplifier 120 which drives a transducer 122 for transmitting the remote control message to the controlled devices. By way of example, transducer 122 may comprise an infra-red (IR) light-emitting diode (LED).

As earlier indicated, at each step of the control sequence, alphanumeric and symbol characters indicating function information are caused to be displayed on display panel 106 in the touch areas surrounding the cross-over points of row conductors 108 and column conductors 110 under the control of a character generator 124 in response to character-representative signals. In accordance with an aspect of the present invention, the character-representative signals are transmitted from the controlled devices to transmitter unit 100 as will be explained below.

The multi-function key arrangement of remote control transmitter 100 reduces the clutter and cost associated with single-function or dedicated key arrangements especially when the number of functions and/or the number of devices to be controlled is large. The key function display provisions significantly reduces the likelihood of confusion normally associated with prior multi-function key arrangements. Key function display arrangements for identifying the functions of multi-function keys are known, as discussed above. However, unlike prior key function display arrangements, the present arrangement does not require modification as new controlled devices are added. This is because the information for determining the functions of the various key elements and for providing the associated key function display is stored in the various controlled devices controlled by transmitter unit 100 (rather than in transmitter unit 100). The key function display information is transmitted from the controlled devices to remote control transmitter 100. Remote control transmitter 100 includes an input transducer 126, e.g., comprising an IR LED, an amplifier 128 and an input storage buffer 130 for receiving and temporarily storing the key function display information transmitted by the controlled devices. The manner in which the key function display information is transmitted by the controlled devices and processed in remote control transmitter unit 100 to indicate the functions of the keys at various steps of control sequence will now be described in detail.

FIG. 2 shows the arrangement of the remote control receivers of the controlled devices which may be controlled by remote control transmitter 100 shown in FIG. 1. By way of example, three home entertainment devices are shown, namely, a television receiver (TV) 200, a video cassette recorder (VCR) 300 and an audio tape player (ATP) 400. Since the remote control receivers (RCVRs) 202, 302 and 402 of all of the controlled devices are similar, only the one (202) for television receiver 200 is shown in detail.

Remote control receiver 202 of television receiver 200 includes an input transducer 204, such as an IR LED, and an amplifier 206 for receiving remote control messages transmitted by transmitter 100 and converting them to corresponding electrical signals. The data of the remote control message, which arrives serially (as it is transmitted), is coupled in the same fashion to a control unit 208 comprising a microprocessor or microcomputer with a CPU 210, a RAM 212 for temporarily storing data and a ROM 214 in which a control program is stored. Under program control, control unit 208 interprets the received remote control data and generates control signals for television receiver 200. Since receiver 202 has to be capable of receiving remote control messages even when the main signal processing portions of television receiver 200 are "off" and are therefor not receiving operating voltages, operating voltages for remote control receiver 202 is provided by a standby power supply (not shown).

As earlier noted, the various functions of a controlled device are controlled in sequential steps of increasing specificity. The control program for television receiver 200 is stored in ROM 214. A portion 216 of ROM 214 contains the key function information for transmitter 100 for each step or level in the control algorithm. Portion 216 of ROM 214 is shown in greater detail in FIG. 3.

As shown schematically in FIG. 3, the information stored in ROM portion 216 is organized in blocks corresponding to the steps or levels of the control algorithm. In each block, for each key of transmitter 100, the character representative information for displaying the function of the key and the memory location of the next step or level of the control algorithm (if the key is activated) is stored in the respective memory locations. The relative addresses of the memory locations within a block correspond to the key designations. For example, the key function display and next step information for key 1 is stored in the first memory location of each block.

When a remote control message is received from transmitter 100, control unit 208, in addition to generating appropriate control signal, retrieves the key function display and next step information from ROM portion 216, stores the next step information in RAM 212 for later use and composes a digitally encoded key function display message in accordance with the key function display information. The key function display message is coupled in serial fashion to an amplifier 218 which drives a transducer 220, such as an IR LED, for transmission to transmitter unit 100.

The key function display messages transmitted by the various controlled devices have the same format. The key function display messages include a block of data for a device code identifying the transmitting controlled device followed by blocks of character representative data for indicating the functions of the respective keys of user entry device 102 of transmitter 100. The key function and display message format can be schematically represented as:

DC, KEY 1, KEY 2, KEY 3, - - - KEY 15 where DC represents the device code and KEY 1 - - - KEY 15 represent the character representative key function display information for respective keys of user input device 102. Framing code words signifying the beginning and end of the key function display message and data blocks within the message are not indicated. It is assumed in this example, dealing with home entertainment products, that user input device 102 has fifteen keys. This permits ten keys for numerical type of controls, such as channel selection in a television receiver and advanced selection of programs ("auto-programming") in a VCR, with a remainder of five keys for other functions. A three-bit device code (DC) permits the remote control unit to control as many as eight different devices. Assuming that three alpha-numeric characters are used to designate each key function and that a seven-bit ASCII code is used, 21 bits per key or 315 for 15 keys are required. Incorporating framing and error protection bits yields less than 1000 bits. A transmission rate of 1000 bits per second is compatible with an infra-red transmission link and provides a reasonably short time, about one second, for updating the key function display as the control operation proceeds from one step to the next.

Again with reference to FIG. 1, the device code block of the key function display information stored in input buffer 130 is transferred to and stored in RAM 116 of control unit 112 and the character-representative key function display blocks are sequentially transferred to character generator 124 under the control of control unit 112. Character generator 124 causes the key function for each key to be displayed in the corresponding key pad area in accordance with the position of the corresponding block of coded data in the received key function display message. Thus, e.g., the key function for key 1 is displayed in the upper left-hand corner of display 106 where the first one of row conductors 108 intersects the first one of column conductors 110 and the key function for key 2 is displayed where the first one of row conductors 108 intersects the second row of column conductors 110 and so on. It is noted that for a particular step in a control sequence, some of the keys may not have corresponding functions. In that case, the ASCII code signifying "no character" or "blank" will be transmitted for each of the three alpha-numeric character positions of the data block associated with the unused key.

When a key of user input device 102 is activated by a user, the remote control message is composed by control unit 112. The remote control message, excluding framing and error protection code words, has the format:

DC, KEY No. The device code (DC) is read from RAM 116, where it was previously stored, and the key number is derived directly from the position of the activated key.

It is noted that since the key function information is stored in the controlled devices, no ROM memory locations are required for storing unique codes designating devices and functions to be controlled. As earlier noted, the device code (DC) is derived from the key function display message previously transmitted from controlled device and the "key no." information merely designates the key that was operated and is independent of the device or function to be controlled. This characteristic of the present invention makes it readily adaptive to new controlled devices.

Again referring to FIG. 2, when a remote control message is received by each of the receiver units 202, 302 and 402 from transmitter unit 100, the received device code is compared to the respective pre-assigned device code. Only the remote control receiver of the controlled device which has the device code corresponding to the one in the remote control message responds to the remote control message. In this example, it is assumed that the device code of the remote control message corresponds to television receiver 200. In response to the key portion of the remote control message, the function of the activated key for the current step of the control algorithm is performed in accordance with a subroutine stored in the memory locations starting at the address indicated by the next step portion of the memory location for the respective key. In some cases, the function associated with an activated key corresponds to presenting the next level of function choices by retrieving and transmitting the key function display information for the next step. In other cases, the function associated with an activated key corresponds to generating a control signal, e.g., such as for increasing the contrast of the picture, and thereafter presenting another level of function choices.

Referring once again to FIG. 1, in addition to the multi-function keys of user input device 102, remote control transmitter 100 also includes three single-function or dedicated function keys 132, 134 and 136.

Dedicated function key 132, labelled "DEVICES", is used to initiate a mode of operation for selecting a particular controlled device in which each of the controlled devices is associated with a respective key of user input device 102. When a user depresses key 132, a corresponding coded remote control message corresponding to "DEVICES" key 132 is composed by control unit 112 and transmitted via driver 120 and transducer 122. Each controlled device responds to the "DEVICES" remote control message by transmitting a key function display message to remote control transmitter 100. Each message transmitted to transmitter 100 by a controlled device includes the respective device code and respective character-representative data (e.g., representing TV, VCR or ATP) assigned to the data block a particular key assigned according to the controlled device. The device identifying messages transmitted by the controlled devices to remote control transmitter are transmitted from the controlled devices at respective predetermined different time delays after the reception of the "DEVICES" remote control message. As the device identifying messages are sequentially received by transmitter 100, the corresponding device identifying characters are caused to be displayed in the touch area corresponding to the respective assigned key and the associated device codes are stored in respective memory locations of RAM 116 of control unit 112.

Thereafter, when a key of user entry device 102 corresponding to a device to be controlled is activated, control unit 112 composes and causes the transmission of a remote control message instructing the selected controlled device to transmit the key function display message for the first level or step of its control algorithm. By way of example, the remote control message may be in the form of:

DC, MAIN where DC corresponds to the device code, previously stored in RAM 116, and MAIN is a code word signifying that the key function display information for the main or first step of the control algorithm of the selected controlled device is to be transmitted from the selected controlled device to transmitter 100.

Dedicated function key 134, labelled "MAIN", is used to call up the main or first level of function control choices of the last one of the controlled devices that was controlled. When key 134 is depressed, control unit 112 retrieves the device code of the controlled device last controlled from RAM 116 and composes and causes the transmission of a remote control message in the form of:

DC, MAIN

This remote control message, as previously discussed with respect to key 132, causes the key function display information for the main or first level of the control algorithm of the selected controlled device to be transmitted to transmitter 100.

Dedicated function key 136, labelled "BACK", is used to recall the last level of function control choices of the last controlled device to be controlled. When a user depressed "BACK" key 136, control unit 112 composes and causes the transmission of a remote control message in the form of:

DC, BACK

Here also, the device code of the last controlled device that was controlled is retrieved from RAM 116. The last controlled device to be controlled responds to this remote control message by retrieving and transmitting the last key function display message. If BACK key 136 is depressed again, the resulting remote control message causes the next-to-last key function display information of the last controlled device that was controlled to be transmitted.

Operating power for transmitter 100 is supplied by a battery 138. The supply voltage (V+) provided by battery 138 is not coupled to the various units of remote control transmitter unit 100 until one of dedicated keys 132, 134 and 136 has been depressed. When one of dedicated switches 132, 134 and 136 is depressed, an "OR" function gate 140 causes a flip-flop (FF) 142 to be set, which in turn causes an electronic switch 144 to couple the supply voltage (V+) to the various units of transmitter 100. Thereafter, switch 144 continues to provide the supply voltage until FF 142 is reset by control unit 112 at a predetermined time after the last user entry by means of either user multi-function entry device 102 or dedicated function keys 132, 134 and 136. Desirably, RAM 116 is nonvolatile since it has to maintain the device code of the selected controlled device even when the supply voltage (V+) is not provided. Alternatively, RAM 116 may be directly connected to battery 138.

The following table indicates a typical control sequence to illustrate, by way of example, the operation of the structure of the remote control system described above with reference to FIGS. 1, 2 and 3. In the table, portions of key function display messages such as KEY1/TV indicate that the data block corresponding to the identified key (e.g., KEY 1) represents the identified characters (e.g., TV).

| | Typical Control Sequence | |
|---|---|---|
| User Input | Transmitter | Receiver(s) |
| Press DEVICES key. | Send DEVICES remote control message. | The controlled devices send their respective DCs and key/device information at predetermined different times. E.g., TV sends TV DC, KEY1/TV, thereafter VCR sends VCR DC, KEY2/VCR, and thereafter ATP sends ATP DC, KEY3/ATP. For all the unused keys, "BLANK" character data blocks are sent. |
| | Store received DCs and display key/device information. | |
| Press key 1 (to select TV). | Send TV DC, KEY1. | Retrieve and send first level function choices for TV. E.g., TV DC, KEY1/CH (channel selection), KEY2/VID (video), KEY3/AUD (audio), KEY4/BLANK, KEY5/BLANK, ... KEY14/BLANK, KEY15/OFF. |
| | Store TV DC and display key function choices for TV. | |
| Press key 1 (for channel selection). | Send TV DC, KEY1. | Retrieve and send function choices for channel selection. E.g., TV DC,KEY1/1, KEY2/2, KEY3/3, ... KEY10/0, KEY11/CHU (channel up), KEY12/CHD (channel down), KEY14/BLANK, KEY13/BLANK, KEY15/OFF. |
| | Store TV DC and | |

| User Input | Typical Control Sequence Transmitter | Receiver(s) |
|---|---|---|
| | display key function for channel selection. | |
| Press key 2 (for first digit of channel number 25). | Send TV DC, KEY2. | Recognize that first digit of channel number has been entered (since KEY2 transmitted) and retrieve and send channel selection function choices again. |
| | Store TV DC and display key function information for channel selection. | |
| Press key 5 (for second digit of channel number 25). | Send TV DC, KEY5. | Tune channel 25. |
| Press MAIN key. | Send TV DC, MAIN. | Retrieve and send first level function control choices for TV. |
| | Store TV DC and display key function information for TV. | |
| Press key 2 (for video control | Send TV DC, KEY 2. | Retrieve and send video control function choices. E.g., TV DC, KEY1/CTU (contrast up), KEY2/CTD (contrast down), KEY3/BRU (brightness up), KEY4/BRD (brightness down), KEY5/PU (peaking up), KEY6/PD (peaking down) KEY7/COU (color up), KEY8/COD (color down), KEY9/TIU (tint up), KEY10/TID (tint down), KEY11/BLANK, ... KEY14/BLANK, KEY15/OFF. |
| | Store TV DC and display key function information for video. | |
| Press key 2 (for increasing contrast). | Send TV DC, KEY2. | Increase contrast as long as transmission continues. When the transmission ends, retrieve and send the video control function choices again. |
| | Store TV DC and display key function information for video. | |
| No entry for predetermined time. | Power down transmitter (decouple the battery). | |
| Press BACK key | Send TV DC, BACK. | Retrieve and send function choices for channel selection. |
| | Store TV DC and display key function information for channel selection. | |
| Press key 11 (for increasing the channel number). | Send TV DC, KEY11. | Increase the channel number as long as the transmission continues. When transmission ends, tune the channel at which transmission stopped. |

It is noted that in the above control sequence that a predetermined key (i.e., key 15) of multi-function user input device 102 is assigned to the "OFF" function in various key function display messages. This allows a user to turn the television receiver off at any step of the control algorithm without having to pass through the first or main function selection step. It will be appreciated that other frequently controlled functions, such as increasing and decreasing the volume level and increasing and decreasing the channel number may be treated in the same manner. It is further noted that in some cases it may be desirable to provide dedicated keys for frequently controlled functions.

It will be appreciated that key function display arrangements are possible other than the one shown in FIG. 1, in which touch-sensitive membrane 104 overlays display panel 106. For example, individual keys and associated individual display elements may be provided (as is disclosed in the above-noted European patent application). However, it appears that the arrangement shown in FIG. 1 is more compact and less cluttered, especially if a large number of function choices are anticipated for various steps of a control algorithm.

While in FIG. 1, input buffer 130 is shown as a device separate from the microprocessor or microcomputer device comprising control unit 112 of transmitter 100, it will be appreciated that input buffer 130 may be incorporated in the same device.

As earlier noted, the present remote control arrangement in which the key function display information is stored in the controlled devices (rather than in the transmitter unit) is advantageous since it readily allows for the addition of new controlled devices without modification of the transmitter unit. The present remote control arrangement is also advantageous since it significantly reduces the memory capacity required for the transmitter unit compared with the system disclosed in the above-noted European patent application. Depending on the complexity of the control programs stored in the program memories of the remote control receiver units of the controlled devices, the key function display information may be stored in the same memory device as used for storing the program for controlling the controlled devices (as is indicated in FIG. 2 by ROM 214 including key function and display memory portion 216). Alternately, the key function and display information may be stored in a separate memory device.

The modifications described above to the embodiment shown in FIGS. 1, 2 and 3 as well as others are intended to be within the scope of the invention defined by the following claims.

What is claimed is:

1. A remote control system for at least one controlled device, comprising:
   a transmitter unit including user entry means having a plurality of multi-function key elements; output means for transmitting, when a key element is operated, a remote control message identifying the operation of said key elements; and display means for displaying information identifying the functions associated with said key elements;
   a receiver unit associated with said controlled device and including input means for receiving said remote control message; key function memory means for storing character-representative information for identifying the functions of said key elements of said transmitter unit and corresponding control information for various steps of a control sequence for controlling said controlled device; and output means coupled to said key function memory means for transmitting a key function display message including character-representative information of a next step of said control sequence in response to said remote control message and also information identifying said controlled device; and wherein
   said transmitter unit further includes input means for receiving said key function display message and for coupling the associated character-representative information to said display means to cause said key function information to be displayed;
   said transmitter unit still further includes memory means for storing said device identifying information included in said key function display message; and
   said remote control message transmitted by said transmitter unit includes said device identifying information stored in said memory means.

2. The remote control system recited in claim 1, wherein:
   said display means includes a display panel; and said user entry means comprises a translucent or transparent touch-sensitive member that overlays said display panel.

3. The remote control system recited in claim 1, wherein:
   said key function display message transmitted by said output means of said receiver unit is organized in data blocks each including character-representative information for identifying the function of a respective key element, the position of said data blocks within said key function display message being determined by the location of said respective key elements on said transmitter unit.

4. The remote control system recited in claim 1, wherein:
   said transmitter unit includes a dedicated function key; and said output means of said transmitter unit transmits a remote control message, when said dedicated key is operated, identifying the operation of said dedicated key; and
   said output means of said receiver unit transmits a key function display message for a predetermined step of said control sequence in response to said remote control message identifying the operation of said dedicated key.

5. The remote control system recited in claim 1, wherein:
   said transmitter unit includes a dedicated function key; and said output means of said transmitter unit transmit a remote control message, when said dedicated key is operated, identifying the operation of said dedicated key; and
   said output means of said receiver unit transmits a key function display message including character-representative information for identifying a predetermined one of said key elements for controlling said controlled device.

* * * * *

UNITED STATES PATENT AND TRADEMARK OFFICE
CERTIFICATE OF CORRECTION

PATENT NO. : 4,746,919

DATED : May 24, 1988

INVENTOR(S) : Glenn Arthur Reitmeier

It is certified that error appears in the above-identified patent and that said Letters Patent is hereby corrected as shown below: On the title page:

In the Abstract, Line 2, "function" should be -- functions --.

Column 6, line 14, "DC, KEYNO." should be on its own line.

Column 9, line 29, "function choices" should be under "Receivers" column.

Column 10, line 8 should be moved up so no space in column.

Signed and Sealed this

Thirteenth Day of December, 1988

Attest:

DONALD J. QUIGG

*Attesting Officer*      *Commissioner of Patents and Trademarks*